Aug. 21, 1962 F. G. PALCANIS ET AL 3,050,092

MARINE LOADING ARM

Filed June 26, 1959 4 Sheets-Sheet 1

Franklin G. Palcanis
Thomas M. Lynam Inventors
By W. O. T. Heilman Patent Attorney

MARINE LOADING ARM

Filed June 26, 1959 4 Sheets-Sheet 2

Franklin G. Palcanis
Thomas M. Lynam
Inventors
By Patent Attorney

MARINE LOADING ARM

Filed June 26, 1959 4 Sheets-Sheet 3

Franklin G. Palcanis
Thomas M. Lynam
Inventors

By W. O. T. Heilman
Patent Attorney

Franklin G. Palcanis
Thomas M. Lynam
Inventors
By W. D. Heilman
Patent Attorney 3,050,092
MARINE LOADING ARM Franklin G. Palcanis, Mountainside, and Thomas M. Lynam, Roselle, N.J., assignors to Esso Research and Engineering Company, a corporation of Delaware Filed June 26, 1959, Ser. No. 823,223
7 Claims. (Cl. 141—387)

The present invention is concerned with an automatic loading arm, particularly, for use in conjunction with marine loading equipment. In accordance with the present invention, a control device is positioned at or near the outboard end of the loading arm which senses and makes small changes in the relative position of the loading arm and the tanker manifold connection. Furthermore, a specific embodiment of the present invention comprises a unique "free-wheeling" arm which will automatically adjust to any position of the tanker and will not impose any appreciable weight on the tanker loading connection.

The rapid loading of marine equipment with liquid products as, for example, hydrocarbons and the like, has always presented a problem due to the continuous shifting of the marine equipment being loaded. This shifting of marine equipment is due to tidal variations, changes in the ship's draft during the loading operations and also wave and wind action. Thus there exists the problem of continually adjusting the position of the loading arm to compensate for these changes. Any appreciable change in the relative position of the loading arm, unless corrected, will cause a severe strain on the tanker connections and in many instances cause them to break, thereby putting the tanker out of operation until repairs are effected. This is a very expensive operation. Thus, the present invention is concerned with a very effective self-adjusting loading arm equipment which will automatically adjust to the continually changing positions of the tanker and will not impose any undue stress on the tanker connection.

Figure 1:
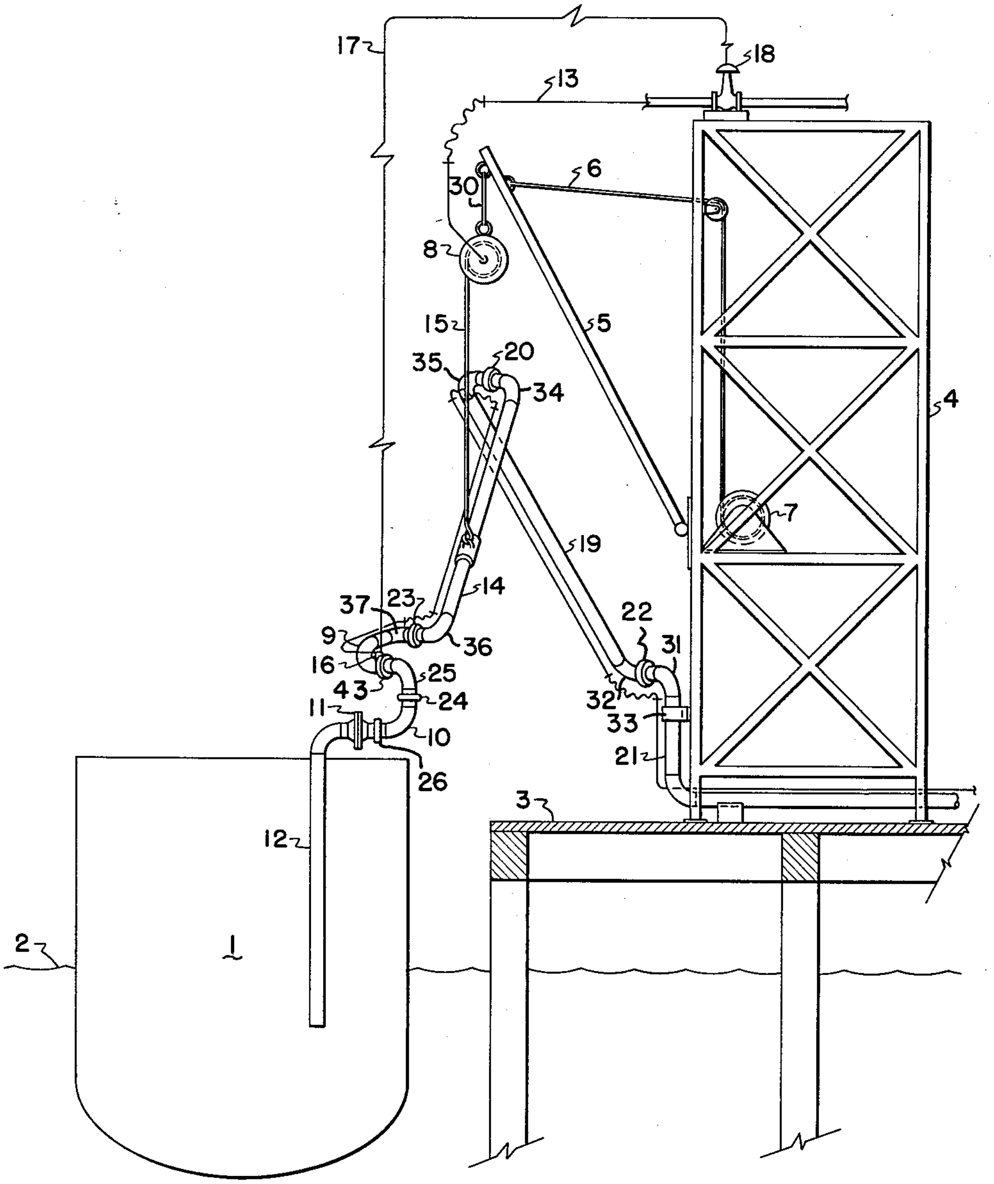
Figure 2:
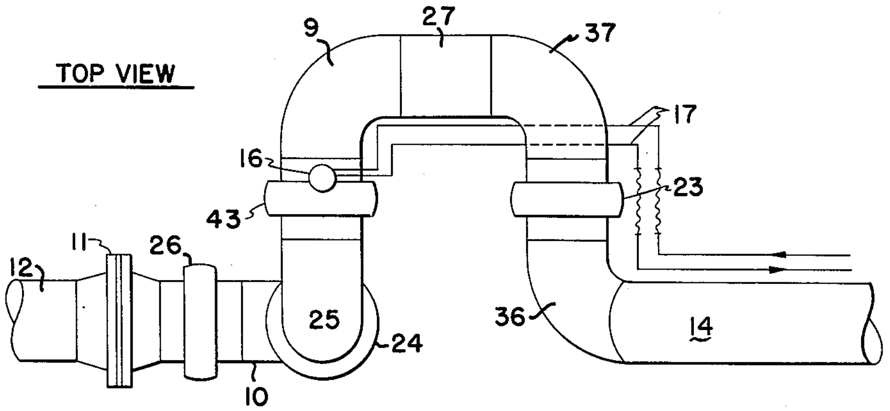
Figure 3:
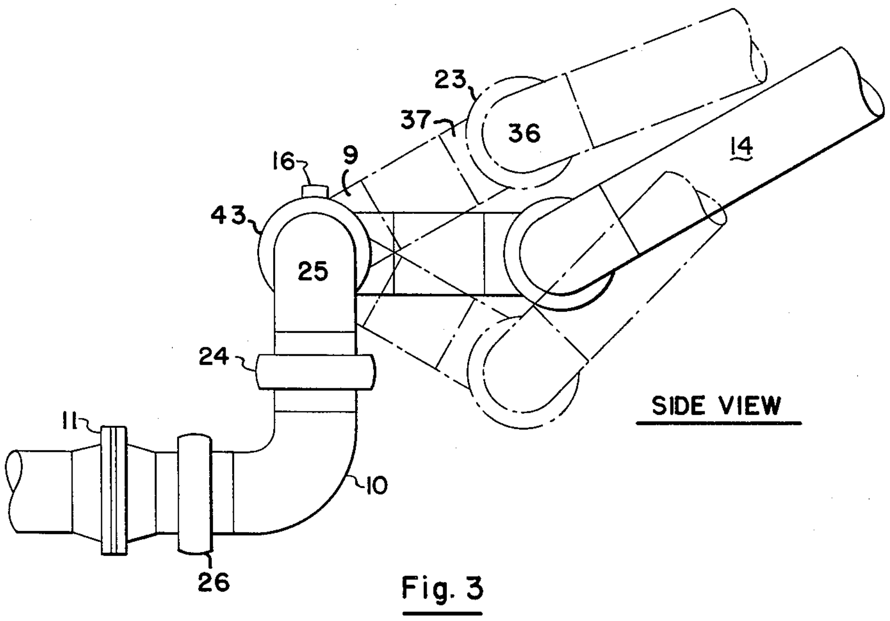

The present invention may be readily understood by reference to the drawings illustrating embodiments of the same. FIG. 1 diagrammatically illustrates the basic equipment employed in the loading of a marine tanker. FIGS. 2 and 3 illustrate the particular desirable flexible coupling and the sensing device of the present invention. FIGS. 4, 5, 6 and 7 diagrammatically illustrate various methods of operating the sensing device of the present method.

Referring specifically to FIG. 1, a tanker 1 is shown afloat on the surface of water 2 beside loading pier 3. A superstructure 4 is positioned on pier 3, having attached thereto on the outboard side a U-boom 5 including its hoisting equipment which includes a U-boom cable 6 and a U-boom cable drum 7 and necessary power equipment not shown. Attached to the movable U-boom by means of connection 30 is an automatic hoist 8 which in turn is attached to the outboard leg 14 of the loading arm by means of connection 15. Thus, by actuating automatic hoist 8, the position of the outboard leg 14 can be moved upwardly or downwardly. Initially, the position of the outboard leg 14 can be also controlled by the extent to which U-boom 5 is raised or lowered by means of drum 7 and cable 6.

The improved flexible marine loading arm of the present invention is adapted to be attached to a permanent stationary loading arm 21 which extends from the liquid fuel shore tank not shown to a position adjacent the superstructure. The loading arm combination of the present invention comprises an inboard leg 19 and an outboard leg 14. The end of inboard leg 19 is attached to the vertically extending stationary loading arm 21 by means of a primary flexible connection or movable joint. This primary movable joint, in essence, comprises two 90° elbows, 31 and 32. Elbows 31 and 32 are connected to each other by means of a swivel 22. Elbow 31 is adapted to rotate in a horizontal plane with respect to line 21 by means of swivel 33. One end of elbow 32 is rigidly attached to inboard leg 19. Thus, elbow 32 is adapted to rotate with respect to elbow 31 in a vertical plane by means of swivel 22.

The other end of inboard leg 19 is attached to one end of outboard leg 14 by means of a secondary flexible connection or movable joint which, in essence, comprises two 90° elbows, 34 and 35. One end of the first elbow 35 is rigidly attached to one end of inboard leg 19 and attached at its other end to elbow 34 through swivel joint 20. Thus, elbows 34 and 35 are adapted to rotate with respect to one another in a vertical plane. The other end of elbow 34 is rigidly attached to one end of the outboard leg 14. The other end of outboard leg 14 is attached to fixed line 12 of the tanker 1 at joint or flange 11 through a tertiary movable joint which, in essence, comprises five 90° elbows, 36, 37, 9, 25 and 10.

One end of the first elbow 36 is rigidly attached to the one end of the outboard leg 14. The other end of elbow 36 is attached through swivel connection 23 to one end of the second elbow 37, thus permitting rotation between elbows 36 and 37. The other end of elbow 37 is rigidly attached to one end of the third elbow 9. The other end of elbow 9 is attached to the fourth elbow 25 through swivel connection 43, thus permitting rotation between elbows 9 and 25. The other end of the fourth elbow 25 is attached to a fifth elbow 10 through swivel 24, thus permitting rotation between elbows 25 and 10. The other end of the fifth elbow 10 is attached through swivel 26 to the fuel line 12 of the tanker through rigid flange connection 11.

The sensing device which may comprise a level or equivalent means is positioned in the tertiary movable joint to determine the relative position of members of the tertiary movable connection as, for example, as to whether the line between the one end of the second elbow 37 and the one end of the third elbow 9 are in a relatively horizontal position. If the relative position tends to deviate from the horizontal, a signal is passed through 17 to an actuating or control means 18 hereinafter described, which will actuate hoist 8 by means of 13. Thus, as the position of the tanker moves downwardly, or otherwise shifts, the signal pickup in the tertiary movable joint is actuated. This signal is transmitted to control means 18 which in turn actuates the hoist so as to either raise or lower outboard leg 14 so as to maintain the position of the tertiary movable joint in a predetermined position so as to avoid any strain or load on flange 11, thereby preventing any breakage or contortion of this flange or the ship line to which the flange is secured.

FIG. 2 is a top view of the assembly from outboard leg 14 to flange 11, while FIG. 3 is a side view of the assembly from outboard leg 14 to flange 11. Similar elements on FIGS. 1, 2 and 3 are similarly numbered. A sensing device 16 is positioned on the movable element comprising elbows 9 and 37. A short nipple 27 may connect elbows 9 and 37. This sensing device will be actuated when the movable element comprising elbows 9 and 37 deviates from the horizontal a predetermined number of degrees. This sensing device may comprise any type of level determining instrument, such as a mercury switch. These mercury switches may be similar to those described in the Honeywell Mercury Switch Catalogue 90A. In essence, mercury switches are actuated by the flow of mercury which creates electrical contact between two electrodes.

Sensing device 16 may also comprise a mechanical instrument whereby a portion of the instrument is affixed to the stationary elbow 25 and the movable part to the movable elbow 9. Thus, when the angle between elbows 9 and 25 alter a predetermined number of degrees, an electrical circuit or contact will be made between the part of the device affixed to elbow 25 and a part of the device affixed to elbow 9, thereby transmitting a signal through line 17.

The sensing device may also comprise a pneumatic device whereby air is fed to the device which will operate valves when the angle between elbow 9 and elbow 25 deviates a predetermined number of degrees. Hoist 8 may be air-operated or an electrical-operated hoist.

Figure 4:
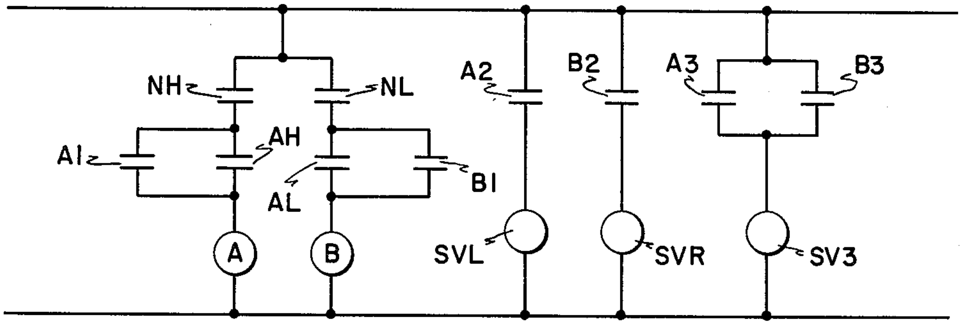
Figure 5:
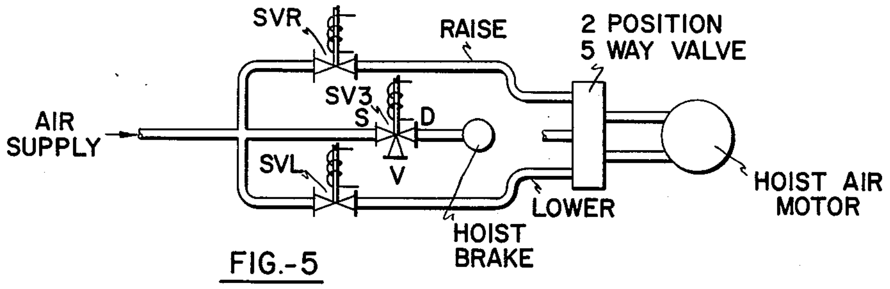
Figure 6:
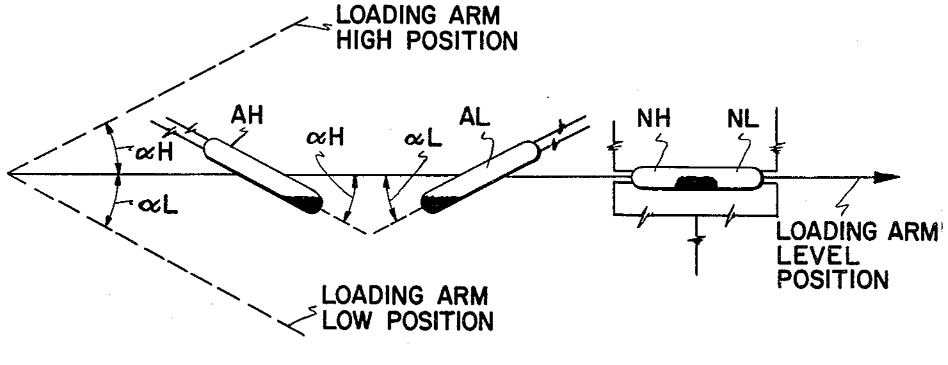

Reference is made to FIGS. 4, 5 and 6 showing in some detail the electrical control circuit, the air circuit and the switch mounting.

Mercury switches are designated as NH—NL, AH and AL. Auxiliary relays are designated as A and B. The normally open contacts of auxiliary relay A are designated as $A_1$, $A_2$ and $A_3$. The normally open contacts of auxiliary relay B are designated as $B_1$, $B_2$ and $B_3$. Two-way solenoid valves are designated as SVL and SVR which are closed when the coil is de-energized. A three-way solenoid valve is designated as SV3 wherein ports S and D are connected when the valve is energized, and ports D and V are connected when the valve is de-energized.

In operation, the mercury switches AH, AL and NH—NL are mounted on the loading arm side of the swivel joint. The mercury switch NH—NL is mounted so that it is level when the loading arm is level. When loading conditions change and the arm starts to rise, switch NH makes contact and completes the circuit, and when the arm starts to fall from the level position, switch NL makes contact. Switch AH is so mounted that it makes contact when the arm reaches the predetermined high position, which position is determined by the angle setting of AH with respect to the arm level position. AL is mounted that it makes contact when the arm reaches the low position, which low position is determined by the angular setting $\alpha_L$ of AL with respect to the arm level position. The position at which AH and AL will make contact are adjustable. Normally, $\alpha_H$ and $\alpha_L$ will be between about 20° and 30°.

In operation under normal conditions with the loading arm at its level position, the mercury switches AH, AL, NH and NL are all open. The solenoid valves SVR and SVL are de-energized and the valves are closed. Also SV3 is de-energized, thus connecting valve ports D and V, which vents the hoist brake operator and engages the brake. If the arm should move above or below the level position, contact NH (for above) or contact NL (for below) would close, but no further action would take place until the arm reached its predetermined high or its predetermined low position.

If conditions should change and the arm starts to rise above the level position (as the vessel falls), mercury switch contact NH closes as soon as the arm is a few degrees above the level position. As the arm continues to rise, it reaches the high position and mercury switch AH closes and energizes auxiliary relay A. Contacts $A_1$, $A_2$ and $A_3$ close under conditions wherein $A_1$ seals in relay A, $A_2$ energizes solenoid valve SVL and $A_3$ energizes solenoid valve SV3. SVL is open and admits air to the lower connection of the hoist air motor. SV3 at this point has ports S and D connected, thus admitting air to the hoist brake operator, which releases the brake.

The arm is lowered by the hoist and as it moves down from the high position, mercury switch AH opens. However, relay A remains energized since contact $A_1$ is closed in parallel with AH and the hoist continues to lower the arm. When the arm reaches the level position, mercury switch contact NH opens. This de-energizes auxiliary relay A. Contacts $A_1$, $A_2$ and $A_3$ also open. $A_1$ opens the seal-in circuit, while $A_2$ de-energizes solenoid valve SVL and $A_3$ de-energizes solenoid valve SV3. The valve SVL is closed and thus air flow to the hoist motor is stopped. Valve SV3 has ports D and V connected, thus venting the brake operator which engages the brake.

As the arm starts to fall below the level position as the vessel rises, mercury switch contact NL closes as soon as the arm is a few predetermined degrees below the level position. As the arm continues to fall, it reaches the predetermined low position and mercury switch AL closes. This energizes auxiliary relay B. The contacts $B_1$, $B_2$ and $B_3$ close. Contact $B_1$ seals in the relay B, while $B_2$ energizes solenoid valve SVR and $B_3$ energizes solenoid valve SV3. Valve SVR is open and admits air to the raise connection of the hoist air motor. The valve SV3 has ports S and D connected, thus admitting air to the hoist brake operator, which releases the brake.

The arm is raised by the hoist and as it moves up from the low position, mercury switch AL opens. However, relay B remains energized since contact $B_1$ is closed in parallel with AL. Thus the hoist continues to raise the arm. However, when the air reaches the level position, mercury switch contact NL opens which de-energizes auxiliary relay B. Also contacts $B_1$, $B_2$ and $B_3$ all open. Contact $B_1$ opens the seal-in circuit, while $B_2$ de-energizes solenoid valve SVR, and $B_3$ de-energizes solenoid valve SV3. The valve SVR is closed and thus air to the hoist motor is stopped. The valve SV3 has ports D and V connected, thus venting the brake operator which engages the brake.

Figure 7:
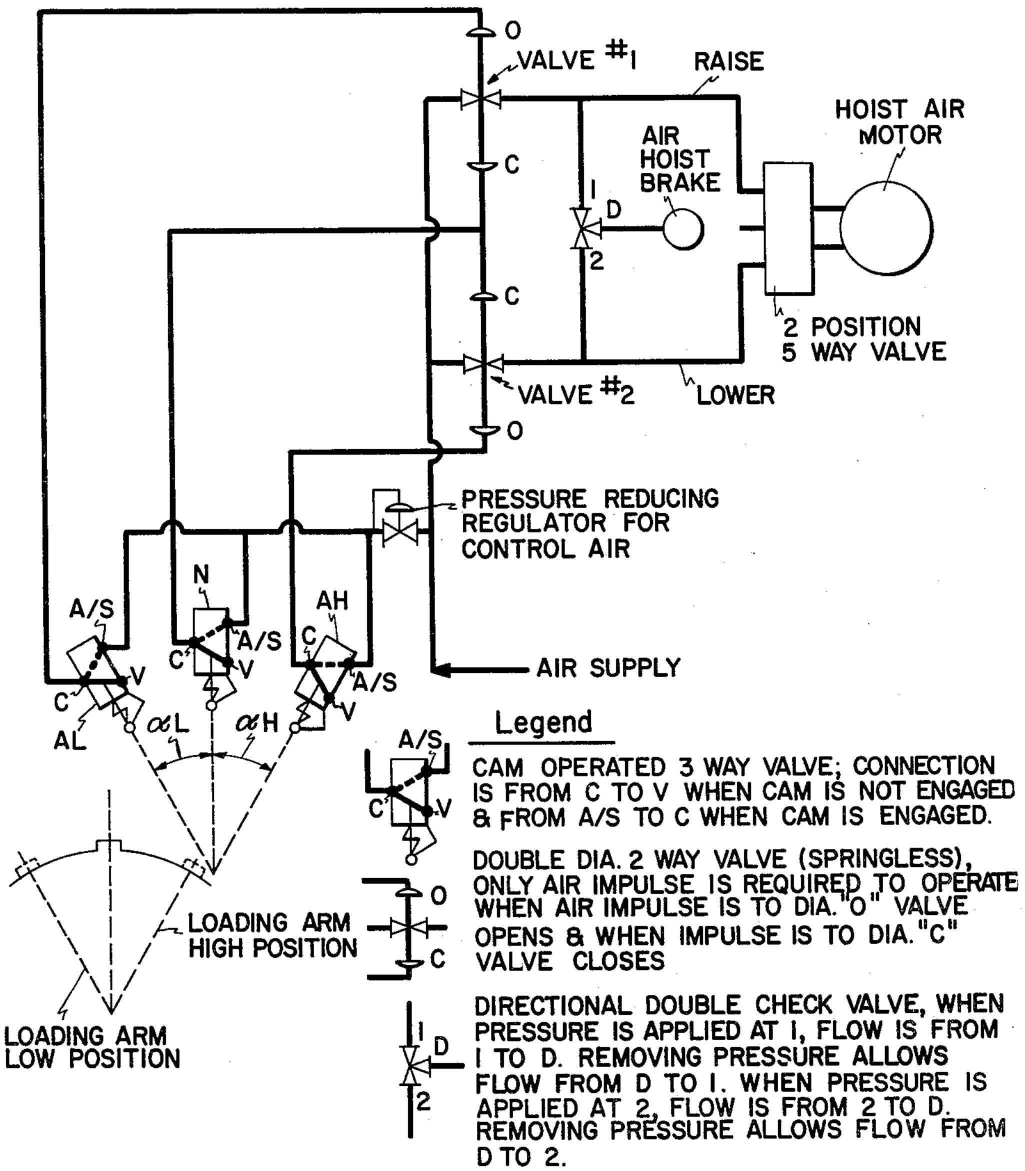

Reference is made to FIG. 7 wherein three cam-operated valves are mounted on the ship vessel side of the swivel joint. Positions of AH and AL are adjustable. These positions are normally 20° to 30° from vertical. A cam is also mounted on the loading arm side of the swivel joint. The cam rotates toward valve AH when the arm rises and rotates toward valve AL when the arm falls. In the normal position with the loading arm level, the cam is vertical and engages cam-operated valve N, which admits the control air to diaphragm C on valves 1 and 2. This places the valves in the closed position and no air is admitted to the motor. The hoist brake operator is vented through the double check valve and the motor thus engages the brake. Valve AL and AH are disengaged. If the arm should move slightly upwardly or downwardly, the cam will disengage valve N, which will vent the control air from diaphragm C of valves 1 and 2. However, they will remain in a closed position until such time as control air is admitted to diaphragm A (i.e. arm reaches the high position for valve 1, or the low position for valve 2).

As the vessel falls, the arm will start to rise and the cam will rotate away from the vertical and towards AH. This disengages valve N which vents the control air from diaphragm C on valves 1 and 2. The valves remain closed and the hoist brake is vented. When the cam reaches the arm high position, it engages valve AH which admits air to diaphragm O of valve 2. This opens valve 2 which admits air to the lower connection of the hoist air motor. Valve 2 also admits air to the brake operator through connection 2 of the directional double check valve which releases the brake. The hoist now starts to lower the arm from the high position. When the arm moves away from the high position, the cam disengages valve AH which vents the control air from diaphragm O on valve 2. The valve, however remains in the open position and the hoist continues to lower the arm. When the arm reaches the level position, the cam engages valve N which admits control air to diaphragm C of valve 2. This closes valve 2 which stops the air to the hoist motor and allows air to vent from the brake operator through the directional double check valve (connection 0 to 2) and through the motor to the atmosphere. This engages the brake.

As the vessel rises, the arm will start to fall. The cam rotates away from the vertical and towards AL, thus disengaging valve N which vents the control air from diaphragm C on valves 1 and 2. The valves remain closed and the hoist brake operator is vented. When the cam reaches the arm low position, it engages valve AL which admits control air to diaphragm O of valve 1. This opens valve 1 which admits air to the raise connection of the hoist air motor. Valve 1 also admits air to the brake operator through connection 1 of the directional double check valve which releases the brake. The hoist will start to raise the arm from the low position. When the arm moves away from the low position, the cam disengages valve AL which vents the control air from diaphragm O of valve 1. The valve, however, remains in the open position and the hoist continues to raise the arm until the arm reaches the level position. At this point, the cam engages valve N which admits control air to diaphragm C of valve 1 which stops air to the hoist motor and allows the air to vent from the brake operator through the directional double check valve (connection 0 to 1) and through the motor to the atmosphere. This engages the brake.

The broad scope of the invention comprises a method whereby the outboard end of the shore-based loading assembly attached to the tanker line is maintained in a relatively horizontal position irrespective of tide and loading conditions by means of a sensing device attached to this outboard end. The sensing device functions to maintain the outboard end of the loading arm in a substantially horizontal position by controlling through suitable means either electrical or pneumatic, an automatic hoist, which will raise or lower the outboard end of the loading arm as loading conditions change.

While the preferred loading assembly has been described in some detail, it is to be understood that the broad scope of the invention may be adapted to other types of loading lines as, for example, flexible lines, such as rubber hoses, plastic hoses and the like.

While it is desirable to maintain the position of the outboard end of the loading arm attached to the vessel line in a horizontal position, it is to be understood that it may deviate somewhat from the horizontal; however, not in excess of plus or minus 30°. It is also understood that when the mechanism is triggered at the predetermined angle as, for example, at plus or minus 30°, the mechanism will continue to function to raise or lower the outboard end of the loading arm until the end adjacent the line vessel is substantially horizontal, preferably, not exceeding plus or minus 3°.

What is claimed is:

1. Improved assembly for loading marine equipment which comprises in combination a marine line affixed to said marine equipment, a shore-based loading assembly, said loading assembly comprising a primary joint comprising two 90° elbows attached to one another and movable with respect to each other, one end of said primary joint attached to a feed line from a shore storage tank and movable with respect thereto, the other end of said primary joint attached to one end of an inboard leg extension of said shore-based loading assembly, a secondary joint comprising two 90° elbows movable with respect to each other, one end of which is attached to the other end of said inboard leg extension, the other end of said secondary joint attached to one end of an outboard leg extension of said shore-based loading assembly, a tertiary joint comprising five 90° elbows movable with respect to one another and attached to the other end of said outboard leg extension, the other end of said tertiary joint attached to said marine line, raising and lowering means, a sensing device positioned on said tertiary joint which will initiate a signal to said raising and lowering means when a section of said tertiary joint deviates a predetermined number of degrees from the horizontal, said raising and lowering means functioning to return said section to a substantially horizontal position.

2. The assembly as defined by claim 1 wherein said sensing device comprises a level mechanism which initiates said signal when said section deviates a predetermined number of degrees from the horizontal.

3. The assembly as defined by claim 2 wherein said level mechanism comprises a plurality of interrelated mercury switches.

4. Improved assembly for loading marine equipment which comprises in combination a marine line affixed to said marine equipment, a shore-based loading assembly, the outboard end section of which is connected to said marine line, said loading assembly comprising a primary joint comprising two 90° elbows attached to one another and movable with respect to each other, one end of said primary joint attached to a feed line from a shore storage tank and movable with respect thereto, the other end of said primary joint being attached to one end of an inboard leg extension of said shore-based loading assembly, a secondary joint comprising two 90° elbows movable with respect to each other, one end of which is attached to the other end of said inboard leg extension, the other end of said secondary joint being attached to one end of an outboard leg extension of said shore-based loading assembly, a tertiary joint comprising five 90° elbows movable with respect to one another and attached to the other end of said outboard leg extension, the other end of said tertiary joint being attached to said marine line, a nipple section between the second elbow and the third elbow of said tertiary joint, raising and lowering means, a sensing device positioned on said nipple which will initiate a signal to said raising and lowering means when said nipple deviates a predetermined number of degrees from the horizontal, said raising and lowering means functioning to return said nipple section to a substantially horizontal position.

5. The assembly as defined by claim 4 wherein said sensing device comprises a level mechanism which initiates said signal when said nipple section deviates a predetermined number of degrees from the horizontal.

6. The assembly as defined by claim 4 wherein said inboard leg extension extends upwardly from said feed line from the storage tank, and wherein said outboard leg extension extends downwardly toward said marine line.

7. The assembly as defined by claim 6 wherein said raising and lowering means are attached to said outboard leg extension.

References Cited in the file of this patent

UNITED STATES PATENTS

| | | |
|---|---|---|
| 1,931,107 | Dowell et al. | Oct. 17, 1933 |
| 2,588,842 | Hutt | Mar. 11, 1952 |
| 2,898,954 | Freeman | Aug. 11, 1959 |
| 2,927,607 | Bily | Mar. 8, 1960 |